United States Patent
Herden et al.

(10) Patent No.: US 8,913,643 B2
(45) Date of Patent: Dec. 16, 2014

(54) LASER SYSTEM AND IGNITION DEVICE FOR AN INTERNAL COMBUSTION ENGINE

(75) Inventors: Werner Herden, Gerlingen (DE); Hans-Jochen Schwarz, Stuttgart (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 725 days.

(21) Appl. No.: 13/256,218

(22) PCT Filed: Feb. 19, 2010

(86) PCT No.: PCT/EP2010/052139
§ 371 (c)(1),
(2), (4) Date: Nov. 18, 2011

(87) PCT Pub. No.: WO2010/105886
PCT Pub. Date: Sep. 23, 2010

(65) Prior Publication Data
US 2012/0055431 A1    Mar. 8, 2012

(30) Foreign Application Priority Data
Mar. 19, 2009 (DE) .......... 10 2009 001 664

(51) Int. Cl.
*H01S 3/091* (2006.01)
*F02P 23/04* (2006.01)
*H01S 3/0941* (2006.01)
*H01S 3/113* (2006.01)

(52) U.S. Cl.
CPC ............ *F02P 23/04* (2013.01); *H01S 3/09415* (2013.01); *H01S 3/113* (2013.01)
USPC .................. 372/71; 372/75; 372/70

(58) Field of Classification Search
USPC ................................. 372/71, 75, 70
See application file for complete search history.

(56) References Cited

U.S. PATENT DOCUMENTS

| | | | |
|---|---|---|---|
| 4,221,472 A | 9/1980 | Smith et al. | |
| 4,847,851 A | 7/1989 | Dixon | |
| 4,860,304 A | 8/1989 | Mooradian | |
| 5,070,505 A * | 12/1991 | Dixon | 372/22 |
| 5,256,164 A | 10/1993 | Mooradian | |
| 5,717,708 A * | 2/1998 | Mells | 372/32 |

(Continued)

FOREIGN PATENT DOCUMENTS

| | | |
|---|---|---|
| DE | 4200204 | 7/1992 |
| DE | 4239654 | 3/1994 |
| DE | 102004001554 | 8/2004 |
| DE | 102006029989 | 1/2008 |
| GB | 2252867 | 8/1992 |

(Continued)

OTHER PUBLICATIONS

International Search Report, PCT International Patent Application No. PCT/EP2010/052139, dated Jun. 8, 2010.

*Primary Examiner* — Kinam Park
(74) *Attorney, Agent, or Firm* — Kenyon & Kenyon LLP

(57) ABSTRACT

A laser system for an ignition device of an internal combustion engine, in particular of a motor vehicle, having a first laser device and a second laser device situated downstream from the first laser device and optically connected to it, the first laser device being designed for generating pump light for optically pumping the second laser device. The first laser device has a reflecting means in an area which is optically connected to the second laser device, the reflecting arrangement being designed for reflecting radiation generated by the second laser device.

14 Claims, 1 Drawing Sheet

(56) References Cited

U.S. PATENT DOCUMENTS

| | | | |
|---|---|---|---|
| 6,865,198 B2 | 3/2005 | Taubman | |
| 2006/0032471 A1* | 2/2006 | Yalin et al. | 123/143 B |
| 2006/0243238 A1* | 11/2006 | Anezaki et al. | 123/143 B |
| 2007/0064746 A1* | 3/2007 | Winklhofer et al. | 372/10 |
| 2009/0133654 A1 | 5/2009 | Bihari et al. | |
| 2010/0000485 A1* | 1/2010 | Vogel et al. | 123/143 B |
| 2010/0031909 A1* | 2/2010 | Herden et al. | 123/143 B |
| 2010/0296530 A1* | 11/2010 | Herden et al. | 372/10 |

FOREIGN PATENT DOCUMENTS

| | | |
|---|---|---|
| JP | 11-509374 | 8/1999 |
| JP | 2006-329186 | 12/2006 |
| JP | 2007-506031 | 3/2007 |
| JP | 2008 045496 | 2/2008 |
| JP | 2008-542600 | 11/2008 |
| JP | 2009-541649 | 11/2009 |
| JP | 2009-541651 | 11/2009 |
| WO | WO 2007/011361 | 1/2007 |
| WO | WO 2008/000587 | 1/2008 |

* cited by examiner

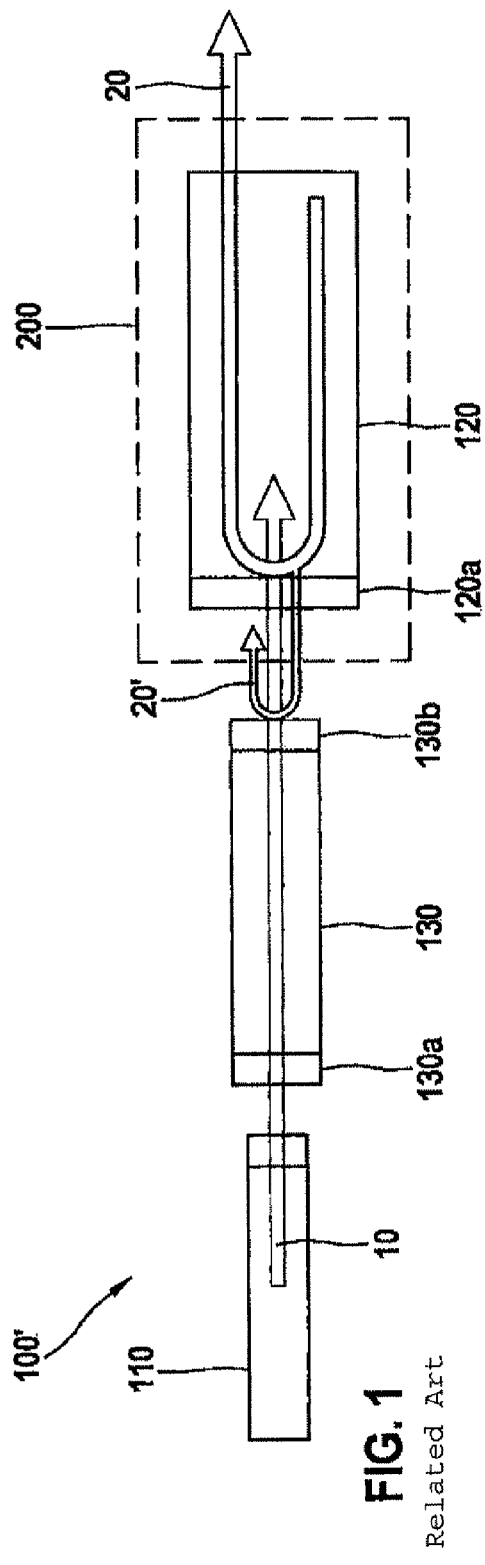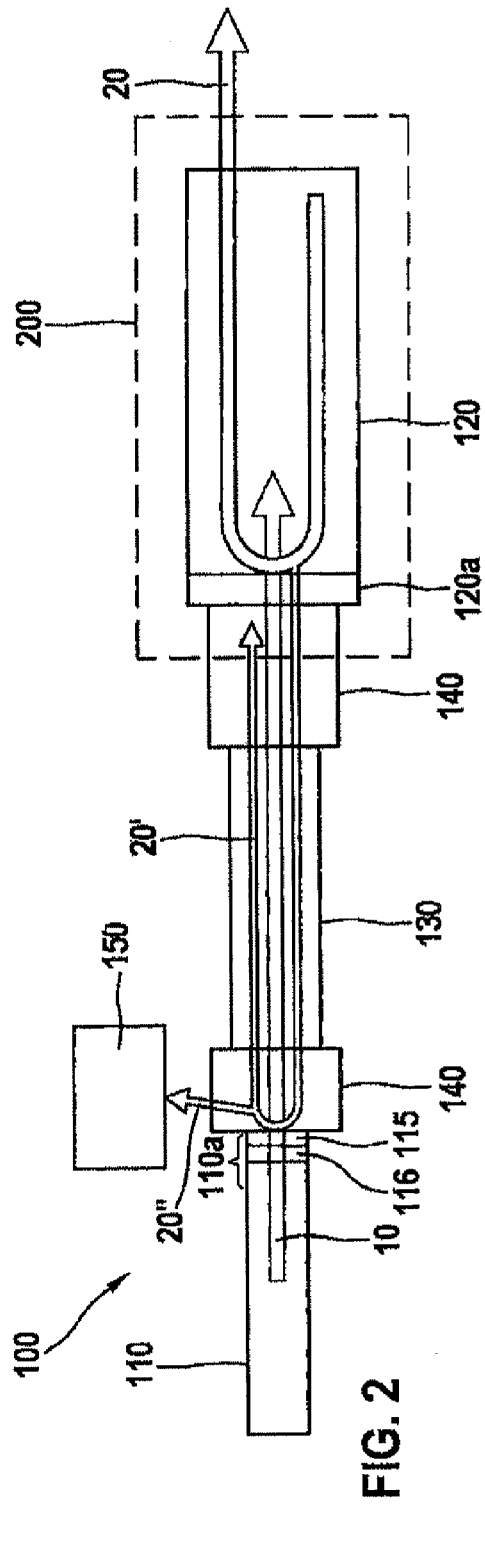

US 8,913,643 B2

LASER SYSTEM AND IGNITION DEVICE FOR AN INTERNAL COMBUSTION ENGINE

FIELD OF THE INVENTION

The present invention relates to a laser system for an ignition device of an internal combustion engine, in particular of a motor vehicle, having a first laser device and a second laser device situated downstream from the first laser device and optically connected to it, the first laser device being designed for generating pump light for optically pumping the second laser device.

BACKGROUND INFORMATION

A conventional laser system is depicted schematically in FIG. 1. Conventional laser system 100' has a laser device 110 designed as a semiconductor-diode laser which generates pump light 10. Pump light 10 is transferred via a fiber optic device 130 to second laser device 120 which is normally situated directly in a laser spark plug 200.

Second laser device 120 pumped by pump light 10 may be in particular a Q-switched laser device which generates high-energy laser pulses 20 for the laser ignition of an air-fuel mixture.

One disadvantage of conventional laser system 100' is that portions 20' of laser pulses 20 generated by second laser device 120 may reach first laser device 110 and damage it. In order to prevent this, reflective layers 120a, 130b are provided on second laser device 120 itself or also on optical components 130 situated between the first and second laser device. The application of reflective layers 130b, in particular on fiber optic device 130, is the cause of high production costs for such laser systems 100'.

SUMMARY

An object of the present invention is to improve a laser system of the type mentioned at the outset to make simpler and more cost-effective production possible while simultaneously providing more reliable protection of the first laser device against high-energy laser pulses generated by the second laser device.

This object may be achieved according to an example embodiment of the present invention in which the first laser device has a reflective arrangement in an area which is optically connected to the second laser device, the reflective arrangement being designed for reflecting radiation generated by the second laser device.

The assignment according to the present invention of the reflective arrangement to the first laser device designed as a pump light source has the advantage that optical components provided between the laser devices and used for implementing the optical connection of the two laser devices need not be separately provided with a reflective arrangement or reflective layers. This simplifies the manufacture of the laser system according to the present invention. In addition to the protection against high-energy laser pulses from the second laser device, the reflective arrangement provided on the first laser device according to the present invention simultaneously offer an improved protection against environmental influences.

In a particularly advantageous specific embodiment of the laser system according to the present invention, it is provided that the reflective arrangement has a transmission coefficient for the radiation generated by the second laser device which is lower than or equal to approximately 50 percent, preferably lower than or equal to approximately 10 percent. This design of the reflective arrangement according to the present invention may ensure that the first laser device used as a pump light source is adequately protected against the high-energy laser pulses of the second laser device.

According to another advantageous variant of the present invention, an improved decoupling of the pump radiation generated by the first laser device results from the fact that the first laser device has a transmission layer in the area which is optically connected to the second laser device, the transmission layer having a transmission coefficient for the radiation generated by the first laser device which is greater than or equal to approximately 85 percent, preferably greater than or equal to approximately 95 percent.

According to another advantageous variant of the present invention, a particularly compact system results if the reflective means according to the present invention are designed as a reflecting coating.

According to the present invention, it is further advantageously possible for the transmission layer and the reflecting coating protecting against the high-energy laser pulses to be situated together on one surface of the first laser device. In addition to the efficient decoupling of pump radiation from the first laser device and the efficient protection against irradiation of high-energy laser pulses into the first laser device, the dual coating of the relevant area of the first laser device also provides increased protection of the first laser device against environmental influences. In particular if the first laser device is designed as a semiconductor-diode laser, the multiple coating advantageously provides an increased mechanical protection of the semiconductor-diode laser.

According to another advantageous variant of the present invention, optical components situated between the first laser device and the second laser device are designed for transmitting radiation generated by the second laser device, i.e., in particular for the high-energy laser pulses. A first advantage of the present variant of the present invention is that the optical components situated between the laser devices have no reflective arrangements designed for reflecting radiation generated by the second laser device, which simplifies a manufacturing process of the laser system according to the present invention.

Furthermore, in a configuration of this type, it is advantageously possible that radiation generated by the second laser device, i.e., including portions of the high-energy laser pulses in particular, may pass through the optical components situated between the laser devices so that it reaches just up to the reflective arrangement according to the present invention in the area of the first laser device. That is where, according to the present invention, a detector may be positioned which is designed for detecting the radiation generated by the second laser device. This advantageously makes it possible to dispense with providing a separate fiber optic device which is used in the conventional systems for conducting parts of the laser radiation generated by the second laser device to a detector. At the same time, however, the reflective arrangement according to the present invention ensure that the first laser device is not adversely affected by the high-energy laser pulses of the second laser device.

According to the present invention, an improved optical coupling between the laser devices and, if necessary, optical components situated between them is ensured by using an immersion medium, which may be in particular an immersion fluid such as, for example, a so-called index matching oil and/or an immersion gel, for example, silicone gel. The use of the immersion medium according to the present invention advantageously makes it possible to even entirely dispense with the application of anti-reflective coatings in the area of a fiber optic device or other components which implement the optical connection of the first laser device with the second laser device.

The laser system according to the present invention may in particular be used advantageously in an ignition device for an internal combustion engine, in particular a motor vehicle. In this connection, the first laser device is preferably provided in a separate module denoted as a pump module, while the second laser device, for example, is integratable directly into a laser spark plug of the internal combustion engine. The optical connection between the pump module and the laser spark plug is produced by a fiber optic device in a conventional manner. The reflective arrangement according to the present invention in the area of the first laser device, which is situated in the pump module, advantageously make it possible to dispense with a particular anti-reflective coating in the area of the fiber optic device.

Additional advantages, features and details are derived from the description below in which various exemplary embodiments of the present invention are presented with reference to the figures. The features referred to herein may be used both individually and in any combination.

BRIEF DESCRIPTION OF THE DRAWINGS

FIG. 1 shows a conventional laser system.
FIG. 2 shows a specific example embodiment of the laser system according to the present invention.

DETAILED DESCRIPTION OF EXAMPLE EMBODIMENTS

FIG. 2 shows a specific embodiment of laser system 100 according to the present invention for an ignition device of an internal combustion engine. Laser system 100 has a first laser device 110, which in the present case is designed as a semiconductor-diode laser and is used for generating pump light 10 for optically pumping a second laser device 120. Pump light 10 is supplied to second laser device 120 via a fiber optic device 130 as shown in FIG. 2.

Second laser device 120 may be, for example, a solid-state laser having a passive Q-switch (not shown), with the aid of which high-energy laser pulses 20 may be generated in a conventional manner. These high-energy laser pulses 20 are used for igniting an ignitable air-fuel mixture situated in a combustion chamber of the internal combustion engine. As shown in FIG. 2, solid-state laser 120 is integrated directly into a laser spark plug 200 of the internal combustion engine.

Laser system 100 according to the present invention insofar corresponds to conventional system 100' according to FIG. 1. According to an example embodiment the present invention, first laser device 110, which is also denoted below as pump laser, has a reflective arrangement 115 which are designed for reflecting radiation generated by second laser device 120, i.e., high-energy laser pulses 20 in this case. This advantageously ensures that pump laser 110 is not damaged by the high-energy laser pulses transferred, if necessary, to pump laser 110 via fiber optic device 130.

Portions 20' of laser pulses 20, which are transferred to pump laser 110 via fiber optic device 130, are preferably reflected or scattered by reflective arrangement 115 according to the present invention in such a way that at least one small portion 20" of laser pulses 20 reach an optical detector 150 which is also situated in the area of pump laser 110. In this way it is possible to monitor the function of second laser device 120, i.e., in particular the generation of laser pulses 120.

In contrast to the conventional system according to FIG. 1, fiber optic device 130 of laser system 100 according to the present invention (FIG. 2) has no reflecting coating 130b (FIG. 1) for high-energy laser pulses 20 because this functionality is implemented by reflective arrangement 115. Fiber optic device 130 may therefore be manufactured in a particularly simple and cost-effective manner and may, as already described above, be used advantageously for monitoring purposes at the same time, in particular for supplying detector 150 with radiation 20', 20" of solid-state laser 120.

Anti-reflective coatings 130a, 130b, which make it possible to couple and decouple pump light 10 into or out of fiber optic device 130 efficiently, which are also in conventional system 100' according to FIG. 1, may also be dispensed with according to the present invention because an immersion medium 140 is advantageously provided in the connection areas between first laser device 110 and fiber optic device 130 and between fiber optic device 130 and second laser device 120. Immersion medium 140 is preferably a so-called index matching oil or also a silicone oil.

The provision of reflective arrangement 115 according to the present invention in the form of a reflecting coating on a face of pump laser 110 used for decoupling pump light 10 has the additional advantage that, together with customary anti-reflective coating or transmission layer 116, which is also situated on the face of pump laser 110 used for efficiently decoupling pump light 10 from pump laser 110, it provides an increased mechanical protection of pump laser 110 against environmental influences. In connection with immersion medium 140, which is also situated in the face area of pump laser 110, this results in an optimal protection of pump laser 110 against environmental influences such as, for example, dirt particles and the like.

The provision of reflective means 115 according to the present invention in the form of a reflecting coating directly on pump laser 110 makes an optimized manufacturing process possible for pump laser 110 according to the present invention because both anti-reflective coating 116 and reflective layer 115 may be applied to the front face of pump laser 110 in one single operation. Furthermore, a comparable coating of the faces of fiber optic device 130 is no longer necessary.

The optional positioning according to the present invention of optical detector 150 in the area of pump laser 110 is of particular advantage because electrical terminals for detector 150 may be combined with electrical terminals of pump laser 110 which are already present.

A combined anti-reflective and reflective coating 115, 116 for the face of pump laser 110 may, for example, be made up of a layered structure which includes layers of aluminum oxide ($Al_2O_3$) and titanium oxide (TiO) on an alternating basis. The number of layers and the layer thicknesses are selected in a conventional way as a function of the wavelengths of pump light 10 and high-energy laser pulses 20 in order to obtain the desired transmission coefficients.

Preferably, transmission layer 116 has a transmission coefficient for pump radiation 10 generated by first laser device 110, the transmission coefficient being greater than or equal to approximately 85 percent, preferably greater than or equal to approximately 95 percent. It is further preferred that reflective layer 115 has a transmission coefficient for laser pulses 20 of solid-state laser 120 which is lower than or equal to approximately 50 percent, preferably lower than or equal to approximately 10 percent.

The present invention may also be implemented in the form of a separate pump light source (not shown) having reflecting coating 115 and is in particular suitable for use in ignition devices of internal combustion engines in the motor vehicle industry and in ignition devices of stationary large gas engines.

What is claimed is:

1. A laser system for an ignition device of an internal combustion engine of a motor vehicle, comprising:
    a first laser device; and
    a second laser device situated downstream of the first laser device and optically connected to the first laser device, the first laser device to generate pump light for optically pumping the second laser device, the first laser device having a reflecting arrangement in an area which is optically connected to the second laser device, the reflecting arrangement to reflect radiation generated by the second laser device.

2. The laser system as recited in claim 1, wherein the reflecting arrangement has a transmission coefficient for the radiation generated by the second laser device, the transmission coefficient being lower than or equal to approximately 50 percent.

3. The laser system as recited in claim 1, wherein the reflecting arrangement has a transmission coefficient for the radiation generated by the second laser device, the transmission coefficient being lower than or equal to approximately 10 percent.

4. The laser system as recited in claim 1, wherein the first laser device has a transmission layer in the area which is optically connected to the second laser device, the transmission layer having a transmission coefficient for the radiation generated by the first laser device which is greater than or equal to approximately 85 percent.

5. The laser system as recited in claim 1, wherein the first laser device has a transmission layer in the area which is optically connected to the second laser device, the transmission layer having a transmission coefficient for the radiation generated by the first laser device which is greater than or equal to approximately 95 percent.

6. The laser system as recited in claim 2, wherein the reflecting arrangement is a reflecting coating.

7. The laser system as recited in claim 6, wherein the transmission layer and the reflecting coating are together situated on a surface of the first laser device.

8. The laser system as recited in claim 1, wherein optical components for transmitting radiation generated by the second laser device are situated between the first laser device and the second laser device, which have no reflecting arrangement to reflect radiation generated by the second laser device.

9. The laser system as recited in claim 1, wherein an immersion medium is provided in the area of optical components situated between the first laser device and the second laser device.

10. The laser system as recited in claim 9, wherein the immersion medium is at least one of an immersion fluid and an immersion gel.

11. The laser system as recited in claim 1, further comprising:
    a detector to detect the radiation generated by the second laser device, the detector being situated in an area of the first laser device.

12. The laser system as recited in claim 1, wherein a fiber optic device is provided for the optical connection of the first laser device to the second laser device.

13. A pump light source for a laser spark plug of an internal combustion engine of a motor vehicle, comprising:
    a first laser device to generate pump light for optical pumping of a second laser device situated in the laser spark plug, wherein the first laser device has a reflecting arrangement in an area which is optically connectable to the second laser device, the reflecting arrangement to reflect radiation generated by the second laser device.

14. An ignition device for an internal combustion engine of a motor vehicle, comprising:
    a laser system for an ignition device of an internal combustion engine of a motor vehicle, the laser system including a first laser device, and a second laser device situated downstream of the first laser device and optically connected to the first laser device, the first laser device to generate pump light for optically pumping the second laser device, the first laser device having a reflecting arrangement in an area which is optically connected to the second laser device, the reflecting arrangement to reflect radiation generated by the second laser device.

* * * * *